United States Patent [19]
Nozik

[11] 3,815,036
[45] June 4, 1974

[54] INFRARED WINDOWS AND OPTICAL COATINGS FOR SAME DERIVED FROM $CD_2SNO_4$

[76] Inventor: Arthur Jack Nozik, 17 Guyer Rd., Westport, Conn. 06880

[22] Filed: Jan. 26, 1973

[21] Appl. No.: 327,057

Related U.S. Application Data
[63] Continuation-in-part of Ser. Nos. 181,916, Sept. 20, 1971, and Ser. No. 181,915, Sept. 20, 1971, Pat. No. 3,773,914.

[52] U.S. Cl. .................. 330/4.3, 331/94.5 S, 350/1
[51] Int. Cl. ............................................. H01s 3/02
[58] Field of Search ................ 330/4.3; 331/94.5 S; 252/301.3, 62.3; 204/129; 423/593, 618; 350/1

[56] References Cited
UNITED STATES PATENTS
3,614,652  10/1971  Nicolai .................................. 350/1

OTHER PUBLICATIONS
Coffeen, "Ceramic and Dielectric Properties of the Stannates," 6/1/53, pg. 207–214, J.A.C.S., Vol. 36, No. 7.
Wolfe et al. "Optical Materials ... for 1-R Instrumentation," 9/59, Proceedings of the IRE, Vol. 47, pg. 1540–1546.

Primary Examiner—Richard A. Farley
Assistant Examiner—N. Moskowitz
Attorney, Agent, or Firm—Roland A. Dexter

[57] ABSTRACT

Cadmium stannate ($Cd_2SnO_4$) is shown to provide an infrared transmitting composition when the electrical resistivity is maintained above 10 ohm-cm. by controlling the oxygen vacancy concentration of the material. Amorphous and crystalline films of $Cd_2SnO_4$ can be disposed on light transmitting substrates and they exhibit high infrared transparency as well as providing protection against adverse atmospheric environments.

In particular, cadmium stannate of high electrical resistivity is shown to be useful as an optical window component (both as the window or as a coating for known windows) for use in high power gas phase lasers.

4 Claims, 1 Drawing Figure

PATENTED JUN 4 1974        3,815,036
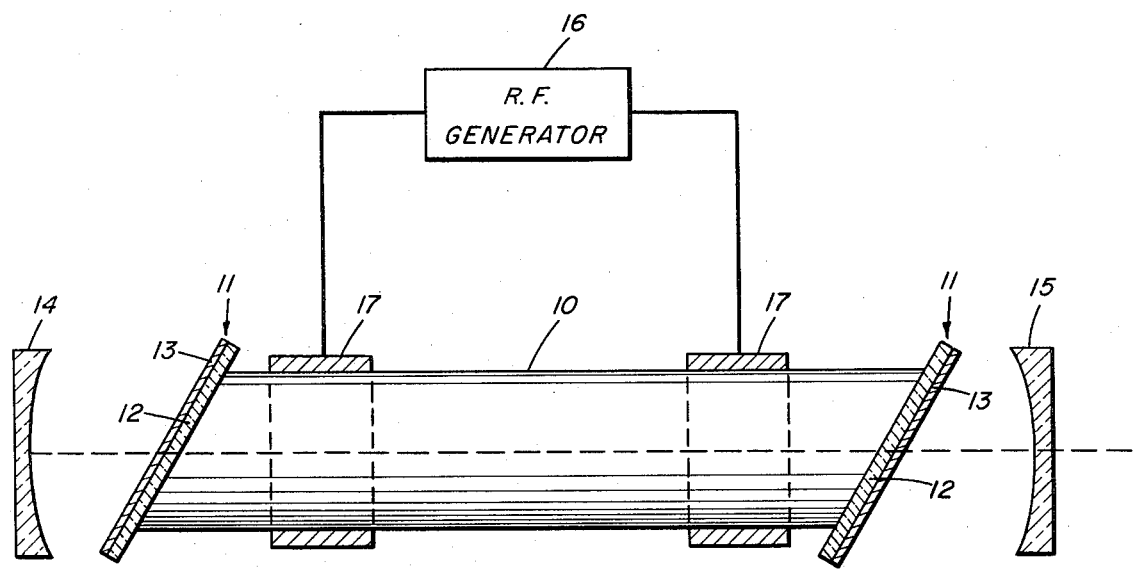

INFRARED WINDOWS AND OPTICAL COATINGS FOR SAME DERIVED FROM CD SNO

This Application is a continuation-in-part of my copending U.S. Pat. applications Ser. No. 181,916, filed Sept. 20, 1971 and Ser. No. 181,915, filed Sept. 20, 1971, now U.S. Pat. No. 3,773,914.

$Cd_2SnO_4$ was first prepared as a powder by A. J. Smith (Acta Cryst. 13, 749 (1960)) who simply reported its crystal structure as orthorhombic and presented powder diffraction data. M. Hassanein (J. Chem. U.A.R. 9, 275 (1966)) later repeated this preparation. Both authors believed $Cd_2SnO_4$ to be a simple stoichiometric compound, implying it to be an insulator.

However, cadmium stannate, has been unexpectedly found to be an n-type defect semiconductor with a conductivity arising from the presence of donor states in the form of oxygen vacancies in the macromolecular structure which are compensated by electrons to maintain overall charge neutrality in the solid. These electrons are readily promoted to the conduction band by thermal excitation and thereby provide the free charge carriers necessary for the conduction process. The conductivity of $Cd_2SnO_r$ can be varied from about $10^{-7} ohm^{-1} cm^{-1}$ to about $10^4 ohm^{-1} cm^{-1}$ by adjustment of oxygen vacancy concentration.

The oxygen vacancy concentration, which is directly related to the conductivity of cadmium stannate, can be readily predetermined according to the teaching of my copending application, Ser. No. 181,916, filed Sept. 20, 1971, by controlling the atmosphere in which the cadmium stannate is made and the thermal treatment it receives during preparation.

Low conductivities, i.e., $10^{-7}$ to $1$ $ohm^{-1}cm^{-1}$ can be achieved by preparing cadmium stannate in an oxygen-rich environment, such as pure oxygen or air.

In my copending Application, Serial No. 181,915, now U.S. Pat. 3,773,914 the cadmium stannate of high resistivity (conductivity less than $10^{-1} ohm^{-1} cm^{-1}$) is stated to have excellent light and heat stability when used in outdoor environments.

With the development of higher-power laser beams, a need has developed for optical windows which will transmit these beams without self-destruction. The most well-known high power gas laser is the $CO_2$ laser which emits beams having a 10.6 micron wavelength. As the power is increased, more laser beam energy is absorbed by the laser window. If the window is not cooled in anyway, its temperature will continue to rise until the physical or mechanical properties of the material alter sufficiently to cause failure by softening, plastic slip, evaporation, dissociation, or melting. However, cooling always involves the introduction of temperature gradients which result in the production of elastic internal stresses. Frequently, these thermal stresses lead to mechanical failure of the window.

The prior art shows that certain meterials are useful as optical windows for such high power gas lasers. These materials include alkali halides and cadmium telluride, gallium arsenide and gallium antimonide (for the latter see U.S. Pat. No. 3,614,652). The most promising windows appear to be potassium chloride, cadmium telluride, and gallium arsenide, all of which unfortunately are subject to adverse degradation from exposure to external environmental conditions including high humidity, high and low temperature extremes, and mechanical abrasion.

OBJECTS OF THE INVENTION

It is an object of this invention to provide an optical component for a high-power laser.

It is also an object of this invention to provide an optical component for a laser which will transmit high-powered laser beams without failure.

It is a further object of this invention to provide a laser window with physical and mechanical properties which will withstand the effects of a high powered laser beam and external adverse environmental conditions.

Other objects, advantages and novel features of the invention will become apparent from the following detailed description of the invention when considered in conjunction with the accompanying drawing.

SUMMARY OF THE INVENTION

According to the present invention, an optical component for a gas phase laser is provided which comprises cadmium stannate of high resistivity in the forms of a large single crystalline window or a coating on known optical windows for said laser.

BRIEF DESCRIPTION OF THE DRAWING

The single FIGURE is a simplified diagrammatic view of a gas-filled laser system illustrating the optical components of the present invention.

DESCRIPTION OF THE PREFERRED EMBODIMENT

Referring now to the drawing, the device shown therein comprises a tube 10, and having an infrared window 11 consisting of a known infrared transmitting material 12 such as KC1, CdTe and GaAs coated with cadmium stannate 13 of high resistivity. Said window 11 is sealed at the appropriate Brewster angle.

A mirror 14 is mounted externally of the tube at its left end; while a similar mirror 15 is externally mounted at the right end of the tube. The mirrors could also be mounted within the laser tube if desired. The mirrors may be glass, copper, or other suitable material and are preferably coated so as to provide maximum reflectance at the emitted wavelength, although broadband mirrors may be utilized if it is desired to obtain possibly more than one emitted frequency. The mirror 15 is not entirely reflective so as to provide a small transmittance. The mirrors are desirably separated by a distance equal to an even multiple of the wavelength which it is desired to amplify, thereby providing the desirable resonant cavity effect. When a tube is filled with a suitable gas mixture such as $CO_2$-$N_2$ and is excited by means of a radio frequency generator 16, which is connected to conducting bands 17 disposed around the tube, the emission of continuous beams of coherent radiation is achieved. A cooling system is usually required but has not been shown in the drawing for purposes of simplicity.

As previously discussed, the configurations of the optical windows of the invention include both a self-supporting crystalline window of cadmium stannate and a conventional optical window for high power gas laser which window is coated with cadmium stannate. In both applications the cadmium stannate must have a resistivity of at least 10 ohm-cm. and preferably greater than about $10^4$ ohm-cm.

The resistivity of crystalline cadmium stannate is controlled by controlling both the atmosphere of formation of cadmium stannate and the subsequent thermal treatment of the reaction product. A material having a high electrical resistivity ranging from 10 to greater than $10^4$ ohm-cm. is obtained by forming the cadmium stannate in pure oxygen and slow-cooling the resulting product.

Amorphous coatings of cadmium stannate may be prepared by a radio frequency sputtering technique. Typically, one technique involves forming a cadmium stannate target from crystalline cadmium stannate powder. The target thus formed and a substrate such as KCl or CdTe are placed in a standard sputtering chamber, one to three inches apart, while the substrate is maintained at a temperature of less than 425°C. The chamber is provided with an oxygen atmosphere and the pressure of the chamber is maintained at about 10 microns. An amorphous film of cadmium stannate may now be deposited on the substrate by radio frequency sputtering at a power level of 50 to 1,000 watts.

As noted above, an amorphous film is obtained with the substrate maintained at a temperature below about 425°C. If the substrate temperature is raised above about 425°C. the deposited film of $Cd_2SnO_4$ exhibits crystallinity.

The electrical conductivity and optical characteristics of the resultant film may be predetermined by regulating the atmosphere wherein the sputtering technique is performed. A high conductivity ranging from $10^2$ to $10^3$ ohm$^{-1}$cm$^{-1}$, may be achieved by sputtering in pure argon. As the oxygen concentration of the sputtering atmosphere is increased, the resulting cadmium stannate film has a correspondingly lower conductivity. For instance, a sputtering atmosphere of 50 percent oxygen - 50 percent argon leads to a product having a conductivity of $10^{-1}$ohm$^{-1}$cm$^{-1}$, while in a pure oxygen environment decreased conductivities ranging to $10^{-7}$ohm$^{-1}$cm$^{-1}$ are produced. In all of these amorphous films useful light transmittance is found to obtain.

The following examples illustrating embodiments and applications of the present invention are not to be construed as a limitation on the invention except as defined in the appended claims.

EXAMPLE 1

12.04 Grams of high purity $SnO_2$ powder and 20.54 grams of cadmium oxide powder are intimately mixed in a mortar and pestile and placed in an open alumina crucible. The crucible is placed in a muffle furnace and heated in 100 percent oxygen at 1050°C. for 6 hours. After this period, the crucible is slowly cooled from 1050°C. to 500°C. at a rate of about 0.5°C. per minute and cooled from 500°C. to 25°C. at about 10°C. per minute.

The resultant cadmium stannate microcrystalline powder is orthorhombic in form and has a conductivity of less than about $10^{-1}$ohm$^{-1}$cm$^{-1}$.

EXAMPLE 2

Crystalline cadmium stannate powder with a conductivity of $10^{-1}$ohm$^{-1}$cm$^{-1}$ is deposited on an aluminum sputtering target. The target is mounted in a standard radiofrequency sputtering chamber and a CdTe disc 2 inches in diameter and having a thickness of 0.25 inches is placed underneath the cadmium stannate target on a water cooled platform at a distance of about 2 inches. The chamber is provided with an atmosphere of 100 percent oxygen at 10μHg pressure, and the cadmium stannate is sputtered onto the cold CdTe substrate at a power level of 200 watts for 1 hour. The resulting film of amorphous cadmium stannate is 0.35μ thick with a bulk resistivity of $10^4$ ohm-cm. The transmissivity of the film is greater than 90 percent over the wavelength range of 0.7μ to 15μ.

EXAMPLE 3

The same procedure as followed in Example 2 wherein KCl is substituted for CdTe as a substrate.

EXAMPLE 4

The same procedure as followed in Example 2 wherein GaAs is substituted for CdTe as a substrate.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a system for the generation of high-power coherent beams of radiation in the infrared including a tube containing a gas mixture having optical windows disposed at the ends of the tube, means for exciting the gas mixture to produce laser radiation in the infrared and means for coupling said laser radiation from said mixture; the improvement comprising $Cd_2SnO_4$ of high resistivity of at least 10 ohm-cm as an infrared window component.

2. The system of claim 1 wherein said cadmium stannate has a resistivity greater than about $10^4$ ohm-cm to about $10^7$ ohm-cm.

3. The system of claim 1 wherein said cadmium stannate is in the form of a self-supporting crystalline body.

4. The system of claim 1 wherein said cadmium stannate is in the form of a coating on an infrared window whereby said window is protected from adverse environmental conditions.

* * * * *